United States Patent

[11] 3,630,673

| [72] | Inventors | William A. Mod<br>Midland, Mich.;<br>Donald L. Caldwell, Lake Jackson, Tex. |
|---|---|---|
| [21] | Appl. No. | 724,627 |
| [22] | Filed | Apr. 26, 1968 |
| [45] | Patented | Dec. 28, 1971 |
| [73] | Assignee | The Dow Chemical Company<br>Midland, Mich. |

[54] SOURCE COMPOSITION FOR ALKALI METAL OXIDES AND ALKALINE EARTH METAL OXIDES
7 Claims, No Drawings

[52] U.S. Cl. ........................................................ 23/184,
23/186, 106/52
[51] Int. Cl. ........................................................ C01d 1/00,
C01f 11/02

[50] Field of Search ............................................ 23/184,
185, 186, 33; 106/52, 53, 54, 118, 306; 252/476

[56] References Cited
UNITED STATES PATENTS

| 2,470,214 | 5/1949 | Egan | 23/184 X |
|---|---|---|---|
| 3,350,213 | 10/1967 | Peyches | 106/52 |
| 3,489,578 | 1/1970 | Pugh | 106/52 |

Primary Examiner—Earl C. Thomas
Attorneys—Griswold and Burdick, C. Kenneth Bjork and Lloyd S. Jowanovitz ABSTRACT: This specification discloses a source composition for alkali metal oxides and alkaline earth metal oxides useful, for example, in preparing a final glass product, the composition having a chemical formula of $Na_2Ca(OH)_4$.

SOURCE COMPOSITION FOR ALKALI METAL OXIDES AND ALKALINE EARTH METAL OXIDES

BACKGROUND OF THE INVENTION

This invention relates to alkaline inorganic compositions as a source material for alkali metal oxides and alkaline earth metal oxides which is useful in a number of application.

A primary object of the present invention is to provide a source composition for alkali metal flux oxides and alkaline earth metal stabilizing oxides.

The above and other objects and advantages will be more fully understood in view of the following description of the present invention.

THE INVENTION

The composition of matter of the present invention comprises an alkali metal oxide—alkaline earth metal oxide source having the chemical formula $Na_2Ca(OH)_2$. The alkaline composition or complex has the following interplanar spacings ($d$ in Angstroms) and intensity ratio ($I/Io$) for the corresponding lattice planes (Miller indices):

| d A° | I/Io | Miller Indices |
| --- | --- | --- |
| 2.82 | 4 | 111 |
| 2.43 | 100 | 200 |
| 1.72 | 40 | ** |
| 1.465 | 2 | 311 |
| 1.402 | 8 | 222 |
| 1.214 | 4 | 400 |
| 1.09 | 6 | 420 |
| 0.995 | 2 | 422 |

The lattice structure of the composition is face centered cubic having a lattice constant of 4.86 A°.

The alkaline composition of the present invention is, for example, highly useful and advantageous as a raw material in the glass industry as a component in a glass making batch to furnish alkali metal flux oxide values and alkaline earth metal stabilizing oxides such as, for example, $Na_2O$ and $CaO$, respectively. With respect to such use in the glass making industry, the alkaline composition prepared in accordance with the present invention is normally substituted for the individual conventional calcium carbonate and sodium hydroxide or soda ash components in a glassmaking batch. In other words, the alkaline composition is prepared in accordance herewith, dried, then ground to a particle size generally consistent with that of the silica sand components, e.g., 50 to 100 mesh or finer, whereupon, the composition so ground is admixed with said glass formers together with the other modifying oxides and fining agents normally employed in glass making batches. The batch is then wetted with from 5 to 10 percent water and is introduced into a glass melting furnace. The batch employing the alkaline composition of the present invention should preferably be mixed in a moist state for a sufficient time to obtain at least reasonable homogeneity and preferably to obtain an aqueous coating of the alkaline composition over the particle surface of as much of the sand component as possible. Such cover along with the use of fining agents such as for example, sodium sulfate, produces a final glass product having a low seed count with a minimum melting and fining time involved.

The present invention in particular provides, in a method of making soda-lime glass, a unique source of alkali metal flux oxides and stabilizing oxides which is nondecrepitating and which has the advantage of reducing the handling of the sand component in glass batches. This is accomplished in as much as the alkaline composition may be readily prepared, either at the glass making plant site or at the site of, e.g. a supply of sodium hydroxide and calcium carbonate. That is, the sand component of glass making batches need not enter into the actual final glass batch composition until just prior to introducing the batch into the melting furnace.

A method of preparing the complex of the present invention comprises reacting sodium hydroxide with an alkaline earth metal oxide source material in an aqueous medium at a temperature within the range of from about 60° to about 318° C., i.e., the melting point of sodium hydroxide for a period of time sufficient to convert by reaction at least a substantial part of the alkaline earth metal oxide source reactant to form the complex $Na_2Ca(OH)_4$. This reaction product while still wet or moist can be utilized as is, granulated and dried, dried to a powder, or spray dried, depending on the use to be made of it.

While calcium hydroxide and calcium carbonate are preferred for use herein as the alkaline earth metal oxide source, dolomitic limestone may also be employed. Dolomite is a mineral comprising essentially an equimolar mixture of the carbonates of calcium and magnesium. In addition, calcium oxide itself, for example, in the form of calcined lime or calcined dolomite may also be used. When line (CaO) or calcined dolomite is employed, the water in the reaction mixture slakes the lime or calcined dolomite to the corresponding hydroxides which in turn reacts in some manner with the alkali metal hydroxide to form the complex compound aforesaid. Similarly, slaked lime ($Ca(OH)_2$) or slaked calcined dolomite may be employed, as the alkaline earth metal oxide source to obtain by reaction with the alkali the aforesaid complex inorganic compound and reaction product.

Sodium hydroxide is preferably added as a 45 to 80 percent aqueous solution. Also preferably for relatively fast reaction time the reactants employed to make the alkaline composition described hereinbefore should generally be of a fine particle size, e.g., less than about —20 mesh U.S. Standard Sieve Series. Reference to mesh size herein is to U.S. Standard Sieve Series.

In the method of preparation above described an operable temperature within the range, for example, of from about 60° to about 318° C. is normally employed in preparing the alkaline composition of the invention and preferably a temperature of from about 100° to about 140° C. While temperatures deviating from the operable range may be employed, there is no advantage in doing so since at temperatures below about 60° C., excessive reaction times are required. In addition, at low alkali metal hydroxide concentrations, for example, below about 45 percent aqueous sodium hydroxide, excessive amounts of heat are required for water evaporation, while at higher alkali metal hydroxide concentrations, for example, higher than 80 percent aqueous NaOH, higher melting points result.

The alkaline composition prepared as described by the aforesaid reaction steps and conditions when calcium carbonate is employed in a 4 to 1 molar proportion of NaOH to $CaCO_3$ typically results in a maximum conversion of about 60 percent of the alkaline earth metal oxide source to form $Na_2Ca(OH)_4$ with sodium hydroxide. As the molar proportion is increased or decreased, the amount of $CaCO_3$ converted to $Na_2Ca(OH)_4$ is correspondingly increased or decreased. Normally included in the reaction product when $CaCO_3$ is used as the alkaline earth metal oxide source is also sodium carbonate monohydrate, anhydrous sodium carbonate, calcium hydroxide and possibly unreacted sodium hydroxide, as well as a predominant amount of the complex inorganic compound aforesaid. When lime (CaO), $Ca(OH)_2$ or calcined dolomite is employed in 2 to 1 molar proportion of NaOH to lime or calcined dolomite, essentially complete stoichiometric conversion is achieved. When lower or higher molar proportions are used, a second phase, e.g. unreacted $Ca(OH)_2$, is found in the reaction product in addition to $Na_2Ca(OH)_4$. While precise quantitative analysis of the reaction product is difficult, tests do show a considerable amount of said complex to be consistently present.

The following examples serve to further illustrate and provide particular and preferred embodiments, but it should be understood that these examples are not intended to limit the invention in any way.

EXAMPLE I

Two-tenths of a mole of aqueous 50 percent caustic soda solution was added at room temperature to one-tenth of a mole of calcium oxide. The mixture was mixed thoroughly for about 20 minutes during which time the temperature ranged from about 80° to about 90° C. The mix was then dried at 140° C. to a solid, alkaline, hygroscopic mass. X-ray diffraction analysis of the resulting reaction product disclosed the interplanar spacings ($d$ in angstroms) and intensity ratios (I/Io) for various lattice planes (Miller indices) as hereinbefore tabulated. The lattice structure of the reaction product is face centered cubic having a lattice constant of 4.86 A°. The starting components and amounts disclose the chemical formula of the compound to be $Na_2Ca(OH)_4$.

EXAMPLE II

Four hundred grams of aqueous 50 percent caustic soda solution was added to 255.5 grams of limestone having a particle size of less than 100 mesh (U.S. Standard Sieve). The mixture had a stoichiometric ratio of essentially two, and was preheated to 140° C. whereupon it was mixed thoroughly in a Hobart 1-gallon laboratory mixer for about 40 minutes during which time the temperature ranged from 60° to 110° C. The mix was quite fluid and after mixing it dried to a solid, nonsticking, alkaline, hygroscopic mass. X-ray diffraction analysis of the −20 mesh fraction (after grinding) of the mass showed $Na_2Ca(OH)_4$ as the major constituent together with lesser amounts of $Na_2CO_3$, and $Ca(OH)_2$, and $CaCO_3$.

EXAMPLE III

Two hundred grams of anhydrous flake caustic soda having a nominal particle size of less than 20 mesh, 255.5 grams of limestone of less than 100 mesh, and 50 ml. of water to make an equivalent of 79 percent caustic soda solution were thoroughly admixed and heated for about 18 minutes to 160° C. to expel water. The admixture, now reacted, was then transferred to another container and granulated which provided a screen analysis of the granules as follows:

| | |
|---|---|
| +8 mesh | 50% |
| −8 +14 mesh | 10% |
| −14 +20 mesh | 10% |
| −20 mesh | 30% |

X-ray diffraction analysis of the −20 mesh fraction showed a complex compound, $Na_2Ca(OH)_4$, as the major constituent with lesser amounts of $Na_2CO_3$, unreacted $CaCO_3$ and some $Ca(OH)_2$ uncomplexed.

EXAMPLE IV 864.5 grams of 50 percent caustic soda solution and 416.0 grams of calcitic limestone (less than 100 mesh) were mixed and heated for 52 minutes to 110° C. in a Hobart mixer. The weights were chosen in the ratio $Na_2O$-to-$CaO$ of 13.0 to 9.4, equivalent to the weight ratio found in a common soda lime silica glass composition, less the amount of $Na_2O$ commonly entering with the feldspar or other alumina source addition. The material was transferred to a Dravo Disc Pelletizer together with 50 ml. $H_2O$ and granulated. Approximately 80 percent of the granules were in the −4 +14 mesh range. X-ray diffraction analysis showed the major constituent to be $Na_2Ca(OH)_4$. Also identified were $Ca(OH)_2$, $CaCO_3$, and $Na_2CO_3$.

EXAMPLE V

Four hundred grams of regular 50 percent caustic soda solution and 231.75 grams of dolomite (less than 100 mesh) were mixed, heated to 110° C. and reacted for 1 hour at 100°–110° C. while stirring in a Hobart mixer. The mix had the stoichiometric ratio of $4NaOH \cdot CaCO_3 \cdot MgCO_3$. The reaction product was dried and X-ray diffraction analysis obtained. This showed the major constituent to be $Na_2Ca(OH)_4$. Also present were $Na_2CO_3$ and $Ca(OH)_2$. The $Mg(OH)_2$ did not produce a diffraction pattern, but after heating the material to 600° the pattern for MgO appeared inasmuch as it had crystallized.

EXAMPLE VI 691.6 grams of 50 percent caustic soda and 184.4 grams of calcined limestone (CaO) were mixed and heated for 35 minutes to 100° C. in a Hobart mixer. The weights were chosen in the ratio $Na_2O$:$CaO$ of 13.9:9.4. The material was dried in an oven at 120° C. to give a hard, white, easily crushed product. X-ray diffraction analysis of the crushed product identified the chief constituent as $Na_2Ca(OH)_4$. A small amount of $Ca(OH)_2$ was also present.

EXAMPLE VII 691.6 grams of 50 percent caustic soda and 243.9 grams of slaked lime [$Ca(OH)_2$] were mixed and heated for 57 minutes to 130° C. in a Hobart mixer. The weights were chosen in the ratio $Na_2O$:$CaO$ of 13.9:9.4. The material was dried in an oven at 120° C. to give a hard, white, easily crushed product. X-ray diffraction analysis of the crushed product identified the chief constituent as $Na_2Ca(OH)_4$. A small amount of $Ca(OH)_2$ was also present.

EXAMPLE VIII

To demonstrate the utility of this invention, glass equivalent to conventional soda-lime-silica container glass was made, using as one constituent the reacted material described in example III. For the purpose of this example and its comparative example, a standard "Seed Count Test" is employed. In general, this test comprises, first, providing an amount of the glass-forming composition to be tested sufficient to provide when melted 50 grams of glass. The composition is then placed in an Englehard standard form No. 201 (250 cc.) platinum-rhodium crucible and exposed to a temperature of about 1,450° C. for a measured period of time whereupon, the viscous molten glass mass is solidified into a patty about 47 mm. in diameter and about 11 mm. in thickness. The patty is released from the crucible, annealed, weighed, and immersed in a dish filled with an indexing liquid of, for example, benzyl alcohol. The dish is placed in a vacuum jar and evacuated until all blemishes on the surfaces of the patty are seen to be filled with liquid. So treated, the patty is placed in a dish filled with the same indexing liquid, a strong light is shone through the side of the patty, a photographic transparency is made and projected onto a screen and the seeds (bubbles) in the magnified projection are counted.

The glass-forming compositions of this and its comparative example were calculated to give a resultant glass of the same approximate oxide composition, as follows:

| | |
|---|---|
| $SiO_2$ | 74.1% |
| $Na_2O+K_2O$ | 14.7 |
| $CaO+MgO$ | 9.4 |
| $Al_2O_3$ | 1.8 |
| | 100.0% |

With glass-forming compositions containing sodium sulfate additions most of the sulfate is volatilized in the melting furnace, and therefore the resultant oxide composition of the resulting glass does not differ appreciably from that given above.

Weight of raw materials used to form one glass patty were as follows:

| | |
|---|---|
| Sand | 34.02 grams |
| Feldspar | 4.50 |
| Reaction Product | 17.00 |
| Sodium Sulfate | 0.30 |
| Water | 3.00 |
| | 58.82 grams |

Before weighing, the reaction product was ground with a mortar and pestle to pass through a 50-mesh screen. Each weighed batch was melted for 2 hours and evaluated as described above. The average "Seed Count" of the resulting patties was 31 seeds per cubic centimeter.

COMPARATIVE EXAMPLE

(Illustrative of Conventional Practice)

For comparative purposes, patties were made by the procedure of example VIII, but using conventional raw material weights of raw materials used to form one glass patty were as follows:

| | |
|---|---|
| Sand | 34.02 grams |
| Limestone | 8.32 |
| Soda Ash | 11.73 |
| Feldspar | 4.50 |
| Sodium Sulfate | 0.30 |
| Water | 3.00 |
| | 61.87 grams |

Each weighed batch was melted for 2 hours and evaluated as described above. The average "Seed Count" of the resulting patties was 49 seeds per cubic centimeter.

"Seed Count" is commonly recognized by those skilled in the art as an indicator of the completeness of the glass making reactions. It is seen that the glass-forming batch of example VIII is far superior to that of conventional practice.

Various modifications can be made in the present invention without departing from the scope or spirit thereof, for it is understood that the invention is limited only as defined in the appended claims.

What is claimed is:

1. A compound for use as a source composition of alkali metal oxides and alkaline earth metal oxides having the chemical formula of $Na_2Ca(OH)_4$, further characterized by a face centered cubic crystal structure having a lattice constant of 4.86 A°.

2. The product, for use as a source composition of alkali metal oxides and alkaline earth metal oxides, made by the process of reacting sodium hydroxide with an alkaline earth metal oxide source material at a temperature within the range of from about 60° to about 318° C.; the amount of sodium hydroxide reacted being from about 2 to about 4 moles per mole of alkaline earth metal oxide source material.

3. The product of claim 2 wherein calcium carbonate is the alkaline earth metal oxide source material.

4. The product of claim 2 wherein calcium oxide is the alkaline earth metal oxide source material.

5. The process which comprises reacting an aqueous mixture of sodium hydroxide and an alkaline earth metal oxide source material, selected from the group consisting of calcium carbonate, calcium hydroxide, dolomite and slaked calcined dolomite at a temperature within the range of from about 60° to about 318° C., to form a source composition of alkali metal oxide and alkaline earth metal oxides; the amount of sodium hydroxide being from about 2 to about 4 moles per mole of alkaline earth metal oxide source material.

6. The process of claim 5 wherein the reaction is carried out at a temperature of from about 100° to about 140° C.

7. The process of claim 5 wherein the alkaline earth metal oxide source material is calcium carbonate.

* * * * *

UNITED STATES PATENT OFFICE
CERTIFICATE OF CORRECTION

PO-1050
(5/69)

Patent No. 3,630,673     Dated December 28, 1971

Inventor(s) William A. Mod et al.

It is certified that error appears in the above-identified patent and that said Letters Patent are hereby corrected as shown below:

In column one, the table between lines 25 and 35, delete " ** " in the third line of the third column and insert --220--.

Signed and sealed this 20th day of June 1972.

(SEAL)
Attest:

EDWARD M.FLETCHER,JR.
Attesting Officer

ROBERT GOTTSCHALK
Commissioner of Patents